Figure 8:
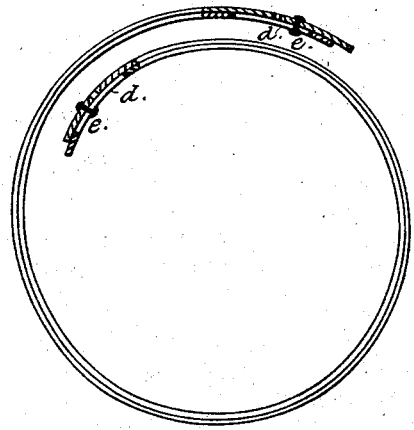

C. H. SLICER.
MOTOR SPRING.
No. 187,424. Patented Feb. 13, 1877.
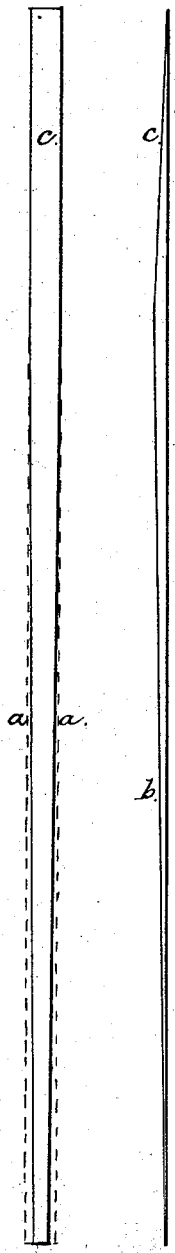
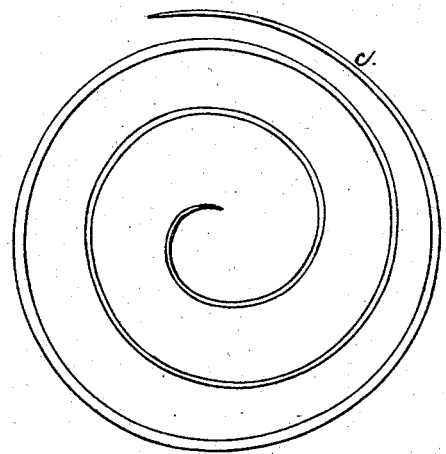
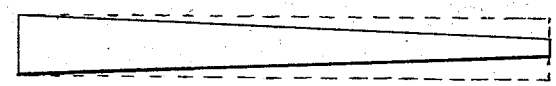
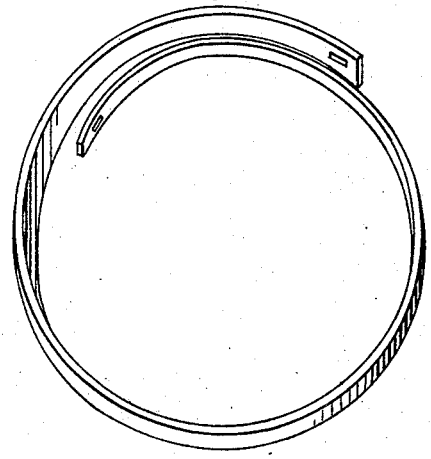
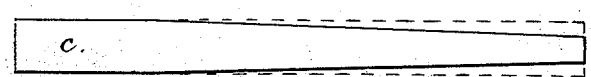
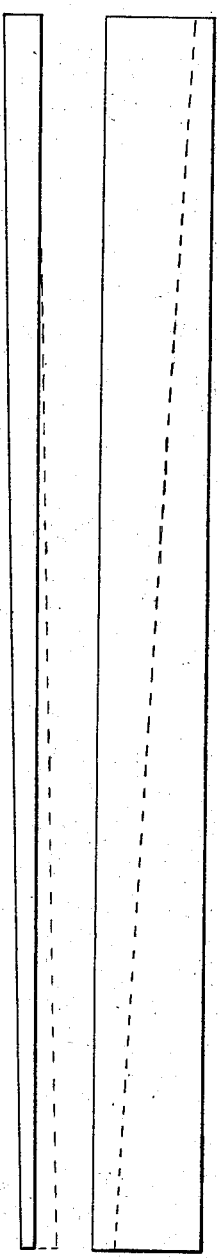
Witnesses:
F. W. Howard
Floyd Norris
Inventor,
Charles H. Slicer
by Johnson & Johnson
Attys

C. H. SLICER.
MOTOR SPRING.

No. 187,424. Patented Feb. 13, 1877.

2 Sheets—Sheet 2.

Witnesses:
F. W. Howard
Floyd Norris

Inventor:
Charles H. Slicer
by Johnson & Johnson

UNITED STATES PATENT OFFICE.

CHARLES H. SLICER, OF BALTIMORE, MARYLAND.

IMPROVEMENT IN MOTOR-SPRINGS.

Specification forming part of Letters Patent No. 187,424, dated February 13, 1877; application filed January 17, 1877.

*To all whom it may concern:*

Be it known that I, CHARLES H. SLICER, of Baltimore city, in the State of Maryland, have invented certain new and useful Improvements in Motor-Springs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The volute spring adapted for a motor is what I have improved.

This class of motors, although extensively used, are well known to be very defective and unsatisfactory in the manner of storing up and giving off their power, while the amount of power they produce is comparatively small in proportion to their weight of metal. It is also a fact that the inner or smaller coils, or those nearest the winding-shaft, and necessarily containing the least amount of metal, are the hardest to close when the spring is being wound, and consequently exert the greatest portion of the power given off by the spring, while the largest or outer coils, containing the greatest amount of metal, exert comparatively feeble resistance to winding, and are consequently the first to close or wind down, closing down upon the smaller coils before the latter close. The result is that most of the power given off by the volute motor now in use is due to the two, three, or more smaller coils lapping near the winding-shaft.

My invention is designed to accomplish, among other things, the more equable distribution of the power of the volute spring throughout its coils than has heretofore been obtained. In fact, I aim to equalize the power of the volute spring from its inner smaller to its outer larger coils, which, so far as I know, has not hitherto been accomplished.

For watches, clocks, sewing-machines, typewriters, and other mechanisms, this class of springs is used, and in every application the defects mentioned exist to a greater or less degree, according to their length.

By my invention I equalize the power of the spring by equalizing the power of its coils—that is to say, rendering the power of the outer larger coils equal to that of the inner smaller coils by a proper distribution of the weight of the metal throughout the spring, by tapering the blade on one or both sides, and on one or both edges, the degree of taper being such as will reduce the inner or winding end of the blade sufficient to equalize it with the outer end, or, indeed, make the latter the strongest, if it should be deemed best for any special purpose.

The reduction in the width and thickness of the blade must be proportioned to its length and thickness and of the whole weight of the spring. The reducing-tapers can be made in various ways to accomplish the same result, so long as the proper reduction of metal is made.

The same principle of distribution and equalization of power may be produced by splitting an ordinary spring blade or ribbon of equal thickness and width to form tapering blades of a degree of strength according to the taper, and to give the narrowest end when being wound an equal power to the widest end.

The degree of taper of this split spring will depend upon the length, width, and thickness of the ribbon or blade, but the equalization of its power can be readily effected by means of single or double edge tapers. In connection with the use of equalized springs of equal thickness, I also multiply or increase the power of the volute spring in a novel and effective manner. I employ for this purpose one or more re-enforcing spring-blades of equal power and size, arranged and connected to each other, and to the inclosing-case and the winding-shaft, in such a manner as to prevent buckling when being wound, so that, while the series of blades may constitute a single spring, yet each of the re-enforcing blades may have a movement independent of the winding blade or spring. This is necessary, since the re-enforcing blades must have a movement upon the winding-blade, which is fastened to the spring-box and winding-shaft. The re-enforcing blades allow of their moving and adjusting themselves endwise during the winding, but their attachment must be such as to hold them in proper relation, while admitting of their movement independent of the hitching-blade.

Figure 9:
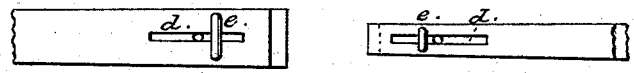
Figure 10:
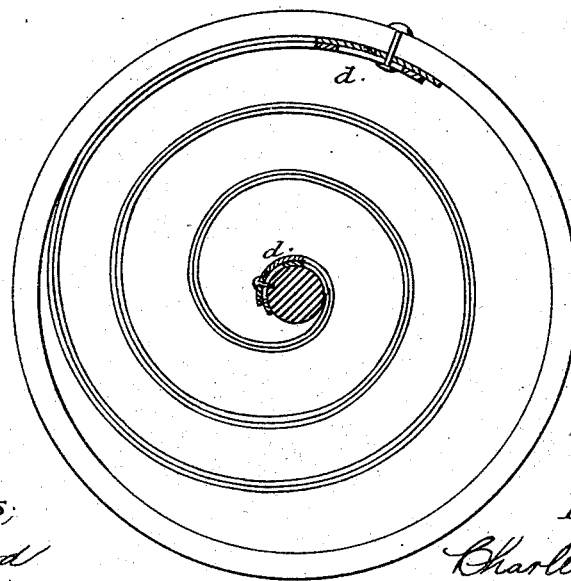

In the accompanying drawings, Figure 1 represents a volute motor-spring embracing my invention; Fig. 2, the same developed in a plain surface; Fig. 3, an edge view of the same. These views show the principle of equalizing the power of the spring by side and edge tapers. Fig. 4 represents a volute-spring blade of equal thickness, having the equalized power produced by edge taper only; Fig. 4A, the same developed in plain; Fig. 5, a blank from which two such equalized blades are formed by splitting. Figs. 6 and 7 are modifications of such spring-blades. Fig. 8 shows such an equalized spring-blade re-enforced to multiply or increase its power as a motor; Fig. 9, the manner of uniting the re-enforced spring or springs; and Fig. 10, the re-enforced spring applied to the box and winding-shaft.

For springs of unusual thickness and power, I take a blade and give it a double-edge taper, combined with a single-face taper. These tapers are shown in Figs. 2 and 3, which is an uncoiled spring. These edge and face tapers $a$ and $b$ may extend throughout the whole spring, or may commence a distance from the outer end sufficient to leave a neutral coil, $c$, by which the spring is fastened to the box. This neutral coil gives a clear and long starting-point for the spring, and serves to give a long bearing to the hitching-coil. The edge and face tapers are the means by which the power of the spring is equalized by taking out more metal than could be removed by either a single edge or single face taper.

In some lengths and thicknesses of blades I have found that the reduction from the starting-point to the end should be about one-half the amount of metal in weight, in others five-eighths, and so on up, governed always by the amount of elasticity and strength of the desired spring. These tapers are for the purpose of giving an excess of metal to the coils extending outward when the spring is being wound—that is to say, the excess increasing from the smallest to the largest coils in proportion to the increased size of the coils, and thus render the power of the several coils as nearly uniform as may be. Or, if desired, this same method of tapers will put an excess of power in the outer coils, where there is an excess of metal, a thing which has hitherto been supposed impossible. Thus I get rid of making the small coils containing the least metal supply the most power. In this case the outer coils will furnish the most pulling-power. I have stated that these tapers may be made in various ways, all accomplishing the same results.

For example, the plate may have a double-edge taper combined with a single-face taper; or a double-face taper combined with a double-edge taper. Any and all of these tapers are made to any degree desired to produce the proper equalization of the power of the coils, or the excess of power in the outer coils. This method of equalizing the power of volute motor-springs may be obtained from the ordinary spring-blade of commerce, such as ordinary ribbon-blades adapted for watches, clocks, sewing-machines, type-writers, &c., and which are of uniform thickness and width throughout their length. This I do by splitting such ribbon-springs so as to form a spring having only a single or double taper, to produce the results before stated, as it is not practicable or necessary in thin or ribbon blades of the usual manufacture to have face-tapers.

In Fig. 5, such a spring is shown as divided equally by a diagonal split, which gives two equalized springs, the tapers being such as to produce this result. In Figs. 6 and 7, such a spring is shown formed by double-edge tapers with or without the neutral or box-fastening coil.

The degree of edge taper or tapers of this spring will, as before stated, depend upon the width, thickness, and length of the ribbon to be equalized. In point of economy the equal diagonal split is most desirable, because two complete equalized springs are obtained from one ordinary blade; but it may be preferable to produce such spring by double-edge splitting or tapering, as shown in Fig. 6, since these tapers render the outer edges equal in length and gives a better balanced spring on its shaft in winding.

An advantage in using this split-ribbon spring, which is of equal thickness throughout its length, is that it admits of its being readily increased or multiplied in power. This I effect by re-enforcing the single spring-blade with one or more blades of like kind, and arranged one upon the other in such numbers as to obtain the desired capacity of the spring. It is important, however, to adapt the re-enforcing springs so that they shall have an endwise movement or adjustment in winding and unwinding in order to prevent buckling. They are not, therefore, rigidly coupled or fastened either to the box, the winding-shaft, or to the re-enforced blade, which re-enforced blade is rigidly secured one end to the box and the other to the winding-shaft.

The manner of connecting the re-enforcing blades with the re-enforced blade is by providing the former with slots $d$ in the direction of their length at their ends, and, if need be, at intermediate points, into and through which pins $e$ extend from the re-enforced blade to which they are secured. These pins $e$ may have heads to lock the plates together, and to cause them to act as one spring.

I may also secure the re-enforcing blades simply by means of the pins used in permanently securing the re-enforced blade to the box and winding-shaft, in which case these pins or hooks enter the slots of the re-enforcing blades, and allow of their proper movement or adjustment endwise in both directions in being wound and in unwinding. This arrangement gives a free and independent endwise movement to each and all of the re-enforcing blades.

Where the re-enforcing blade or blades are used on the outer face of the coils, the button-heads serve to confine them to the re-enforced blade; but when used on the inner face of the coils the shaft-pin and the box-pin, passing through the slots, serve to secure them to their place.

It is important to notice that one result of this equalization of the volute spring is to balance itself around the shaft when being wound, and thereby prevented from pulling to one side of the shaft and crowding to one side of the box.

I claim—

1. A volute motor-spring of equal thickness, and having edge taper or tapers, substantially as and for the purpose herein set forth.

2. Two or more volute motor-springs, equalized in power throughout their length, substantially as described, by means of diagonal or otherwise splitting an ordinary blade of commerce, substantially as herein set forth.

3. A volute motor-spring equalized in power throughout its coils, as described, and increased or re-enforced in power by similar equalized blades, substantially as herein set forth.

4. A volute motor-spring having its outer coils increased in power in excess of its inner coils by giving the outer coils an excess of metal over that required to equalize the whole length, substantially as herein set forth.

5. A volute motor-spring having its re-enforcing blades connected to the re-enforcing blades by means of headed pins $e$ and slots $d$, substantially as and for the purpose herein set forth.

6. A volute motor-spring having re-enforcing blades secured in place with the re-enforced blade by means of the slots and the pins upon the spring-box and winding-shaft, substantially as herein set forth.

In testimony that I claim the foregoing I have affixed my signature in the presence of two witnesses.

C. H. SLICER.

Witnesses:
A. E. H. JOHNSON,
J. W. HAMILTON JOHNSON.